United States Patent
Aubauer et al.

(10) Patent No.: US 11,191,982 B2
(45) Date of Patent: Dec. 7, 2021

(54) FIRE-PROTECTION ELEMENT AND FIRE-PROTECTION WRAP

(71) Applicant: Hilti Aktiengesellschaft, Schaan (LI)

(72) Inventors: Christoph Aubauer, Wasserburg (DE); Egon Berghofer, Scheuring (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/605,862

(22) PCT Filed: May 23, 2018

(86) PCT No.: PCT/EP2018/063471
§ 371 (c)(1),
(2) Date: Oct. 17, 2019

(87) PCT Pub. No.: WO2018/219730
PCT Pub. Date: Dec. 6, 2018

(65) Prior Publication Data
US 2020/0047009 A1    Feb. 13, 2020

(30) Foreign Application Priority Data
May 31, 2017    (EP) .................................... 17173686

(51) Int. Cl.
B32B 3/24        (2006.01)
A62C 2/06       (2006.01)
F16L 5/04        (2006.01)
H02G 3/04       (2006.01)

(52) U.S. Cl.
CPC ............... *A62C 2/065* (2013.01); *F16L 5/04* (2013.01); *H02G 3/0412* (2013.01)

(58) Field of Classification Search
CPC ....................................................... A62C 2/065
See application file for complete search history.

(56) References Cited

U.S. PATENT DOCUMENTS

| | | | |
|---|---|---|---|
| 4,467,577 A | 8/1984 | Licht | |
| 2009/0255619 A1* | 10/2009 | Tong | ........................ E04B 1/944 156/71 |
| 2016/0272891 A1* | 9/2016 | Tong | ....................... C09K 21/14 |

FOREIGN PATENT DOCUMENTS

| | | |
|---|---|---|
| DE | 297 22 652 U1 | 4/1998 |
| DE | 100 07 739 | 8/2001 |
| EP | 1 318 342 | 6/2003 |
| GB | 1 575 308 | 9/1980 |
| GB | 2533356 | 6/2016 |

OTHER PUBLICATIONS

International Search Report dated Jun. 29, 2018 in PCT/EP2018/063471 with English translation.
Written Opinion dated Jun. 29, 2018 in PCT/EP2018/063471.

* cited by examiner

*Primary Examiner* — William P Watkins, III
(74) *Attorney, Agent, or Firm* — Grüneberg and Myers PLLC

(57) ABSTRACT

A fire protection element includes a mat of intumescent material, a reinforcing liner and ventilation holes. Furthermore, a fire protection wrap is used as a fire protection element of this type.

19 Claims, 2 Drawing Sheets

FIRE-PROTECTION ELEMENT AND FIRE-PROTECTION WRAP

This application is a National Stage entry under § 371 of International Application No. PCT/EP2018/063471, filed on May 23, 2018, and which claims the benefit of European Application No. 17173686.1, filed on May 31, 2017.

BACKGROUND OF THE INVENTION

Field of the Invention

The invention relates to a fire-protection element as well as to a fire-protection wrap, for sealing a cable penetration in a wall or ceiling, having such a fire-protection element.

Discussion of the Background

In order to prevent the spread of fire and smoke in buildings, it is known to seal line passages of non-fire-resistant pipes or cables in ceilings or walls with a firestop. The firestop is disposed in the line passage around the lines and it usually contains an intumescent material, which in the fire situation ensures reliable sealing of the line passage. Ablative or mineral materials may also be used.

Furthermore, it is known to cover the lines projecting out of line passage with fire-protection elements in the form of fire-protection wraps, in order to keep the temperature on the side of the line passage turned away from the fire low for as long as possible and hereby to prevent or delay the spread of the fire.

Usually mineral wool is used for this purpose. However, this has the disadvantages that it contains fibers and tends to dust formation. Thus mineral wool is not suitable for locations that must remain as free as possible from dust and fibers, such as clean rooms or telecommunication systems.

The object of the invention is therefore to provide an improved fire-protection element for fire-protection wraps.

SUMMARY OF THE INVENTION

To solve the object, a fire-protection element is provided with a mat of intumescent material, a reinforcing inlay and ventilation holes. The reinforcing inlay serves for stabilization of the intumescent crust formed in the fire situation, and it helps to prevent this from falling in pieces out of the fire-protection element. The ventilation holes are special passage openings intended especially for air circulation. In particular, the ventilation holes are not capillaries or similar tubular structures having a diameter of a few millimeters, such as may occur, for example, in a foamed intumescent material. By means of the ventilation holes, air is able to circulate through the fire-protection element and remove heat. In this way it is possible, for example, to lower the temperature of lines covered by the fire-protection element or to reduce their temperature rise.

DETAILED DESCRIPTION OF THE INVENTION

Figure 1:
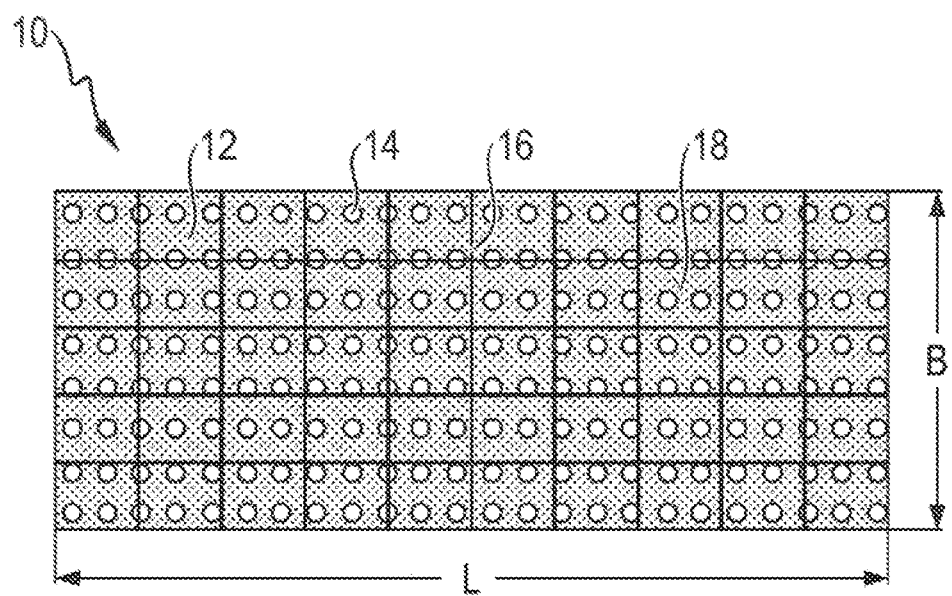
FIG. 1 shows an overhead view of an inventive fire-protection element.

The fire-protection element may have an upper side and an oppositely disposed underside. In this case, the ventilation holes respectively extend linearly from the upper side to the lower side of the fire-protection element. By this configuration, the flow resistance is reduced, and so the air circulation is improved and more heat can be removed.

The reinforcing inlay may extend parallel to the upper side, whereby it stabilizes the fire-protection element uniformly, especially when the reinforcing inlay extends substantially over or through the entire fire-protection element.

The reinforcing inlay may be formed by a mesh or a fabric and consist of metal, expanded metal, glass fibers, basalt fibers, carbon fibers or ceramic fibers. A hybrid structure comprising several materials in the reinforcing inlay is also possible. The higher temperature resistance compared with the intumescent material is advantageous, since the reinforcing inlay is not impaired by the temperature that activates the intumescent material and so is able to exert its stabilizing function in this way.

The reinforcing inlay may be flexible, so that the fire-protection element can be easily adapted to various surfaces, so that the fire-protection element bears tightly on the surface. Therefore the fire-protection element is designed in particular to be not flexurally stiff, in order to permit easy assembly, in which no tools are needed for shaping the fire-protection element. A slight elasticity of the reinforcing inlay may be advantageous, in order to facilitate assembly and to permit press fits as well as to improve the stability of the fire-protection element.

The fire-protection inlay may be disposed in the outer surface of the fire-protection element or may form the surface of one side of the fire-protection element, at least in portions. It is advantageous to position the reinforcing inlay in the surface of the fire-protection element, in order to stabilize the outer faces and in this way to preserve the intumescent crust forming in the fire situation for a longer time on the fire-protection element. Furthermore, in this way the reinforcing inlay may be machined more easily, especially severed, whereby assembly is facilitated.

The reinforcing inlay may be pressed into the surface of the intumescent material. Hereby the fire-protection element can be manufactured inexpensively.

The ventilation holes may have a diameter between 5 mm and 50 mm or between 8 mm and 15 mm. Alternatively, the diameter of the ventilation holes may be equal to 10 mm. Preferably, all ventilation holes have the same diameter, in order to ensure homogeneous properties of the fire-protection element and to reduce the manufacturing costs. Alternatively, ventilation holes having different diameters may also be provided.

The fire-protection element may have a hole density between 100 and 5000 ventilation holes per $m^2$. Alternatively, the hole density may range between 500 and 3000 ventilation holes per $m^2$ or between 1000 and 2000 ventilation holes per $m^2$. In this way, good air circulation can be ensured.

The ventilation holes may be distributed substantially homogeneously over the fire-protection element. Hereby a uniformly good property of the air circulation is ensured and also assembly is facilitated, since the fire-protection element may be installed in various alignments having identical properties.

The fire-protection element may be supplied in the form of endless material and it preferably has a thickness of 8 mm to 15 mm, especially of 10 mm. This means that the fire-protection element is supplied as a tape that is continuously very long, for example in the form of a roll. This has the advantage that portions having the desired length may be cut off as needed from the tape, and so the fire-protection element may be installed in one piece without additional trimming and thus resulting waste is minimized.

The intumescent material may be free of mineral fibers, whereby it is suitable in particular for points of use that must remain free from dust and fibers, such as clean rooms or telecommunication systems.

According to the invention, a fire-protection wrap, for sealing a cable penetration in a wall or ceiling, having an inventive fire-protection element, is also provided for solving the above-mentioned object. The fire-protection wrap can be wound around a cable and/or a cable route, whereby the outer side of the cable and/or of the cable route can be covered. The said ventilation holes extend from the inner surface on the cable side to the surface, on the environment side, on the outside of the fire-protection wrap. In this way, the cable or the cable route is insulated from the environment by the fire-protection wrap. At the same time, air is able to flow through the ventilation holes and to remove heat from the cables or the cable route.

The fire-protection wrap is not limited to being used with cables. Instead of cables, the fire-protection wrap may also be wound around other types of lines, such as pipes, with or without cable route. Furthermore, the fire-protection wrap may also be wound around several lines and/or cable routes, especially having various types of lines.

Figure 2:
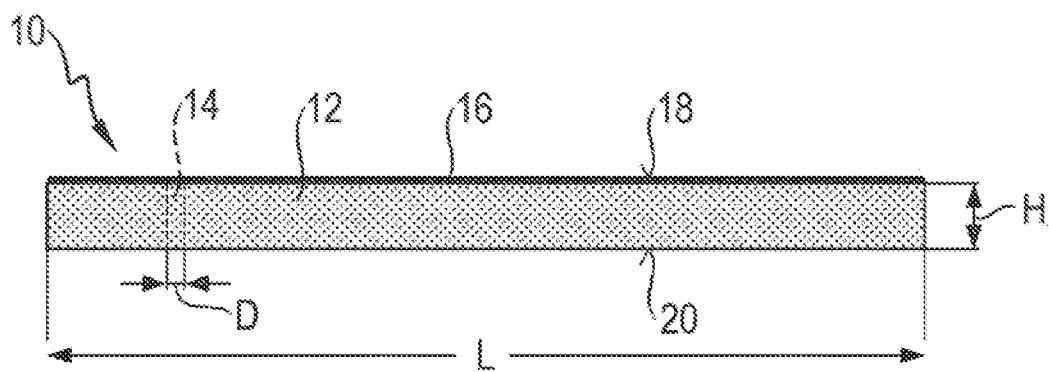
FIG. 2 shows a side view of the fire-protection element.

Further advantages and features will become obvious from the description hereinafter in conjunction with the attached drawings, wherein:

FIG. 1 shows an overhead view of an inventive fire-protection element,

FIG. 2 shows a side view of the fire-protection element from FIG. 1, and

Figure 3:
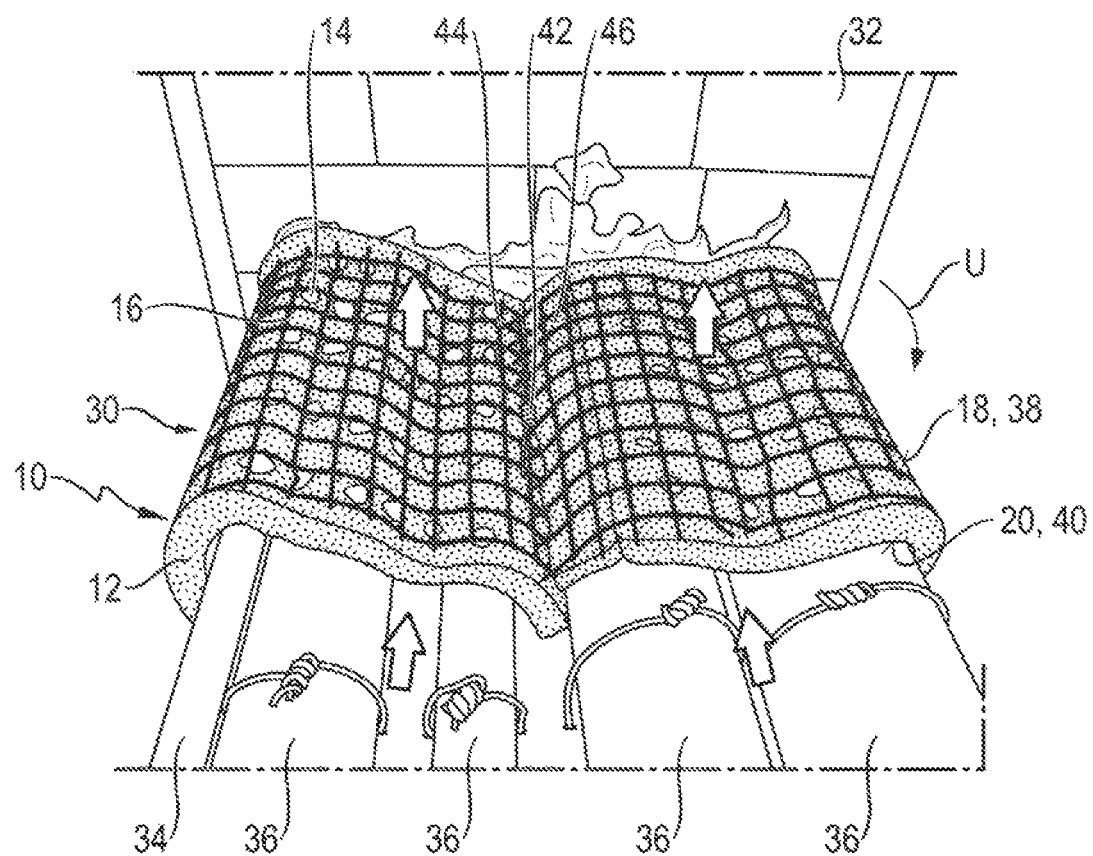
FIG. 3 shows a perspective view of an inventive fire-protection wrap, which is installed in front of a firestop around a cable route.

FIG. 3 shows a perspective view of an inventive fire-protection wrap, which is installed in front of a firestop around a cable route.

In FIG. 1, a fire-protection element 10 is shown that comprises a mat 12 having a multiplicity of ventilation holes 14 as well as a reinforcing inlay 16.

Fire-protection element 10 is rectangular and has a length L of 500 mm, a width B of 150 mm and a thickness H of 10 mm (see FIG. 2). Alternatively, fire-protection element 10 may have other shapes and dimensions. In particular, width B may be between 50 mm and 500 mm and/or thickness H may be between 8 mm and 15 mm. Furthermore, fire-protection element 10 may be provided as endless material, especially as very long tape in the form of a roll, whereby the possible length L is limited substantially only by the length of the tape.

The sides of fire-protection element 10 that extend along length L and width B form an upper side 18 and an opposite underside 20.

Mat 12 consists at least partly of an intumescent material and is substantially free of fibers. In particular, mat 12 contains no mineral fibers.

Reinforcing inlay 16 is a mesh of metal wire. Alternatively, reinforcing inlay 16 may be formed by a mesh or a fabric of metal, expanded metal, glass fibers, basalt fibers, carbon fibers or ceramic fibers. A hybrid structure of reinforcing inlay 16 comprising several materials is also possible. However, materials are more preferred that are fiber-free or contain no unbound fibers and thus are particularly well suited for clean rooms, which are not permitted to be contaminated by free fibers.

Upper side 18 is formed by reinforcing inlay 16, which extends parallel to the surface of mat 12. Reinforcing inlay 16 bears tightly on mat 12 and, as an example, is fastened to mat 12 by means of an adhesive. Additionally or alternatively, reinforcing inlay 16 may be pressed into the surface of mat 12 or be disposed completely or partly therein. In particular, reinforcing layer 16 may be incorporated directly in mat 12 during the production thereof.

Reinforcing inlay 16 extends substantially over the entire width B and length L of fire-protection element 10. Alternatively, reinforcing inlay 16 may be made broader than width B and thus form, on one side or both sides, an overhang (not illustrated), which may be used during assembly for example, to fasten fire-protection element 10, or which may be bent over the sides of fire-protection element 10 in order to stabilize these, especially in the fire situation.

Ventilation holes 14 respectively have a diameter D of 10 mm and are disposed in distributed manner over fire-protection element 10 in the form of an equidistant mesh. Alternatively, ventilation holes 14 may have a diameter D between 5 mm and 50 mm or preferably between 8 mm and 15 mm. Furthermore, ventilation holes 14 may have different diameters D. In an alternative embodiment, ventilation holes 14 may be disposed in any desired distributed manner over fire-protection element 10, although a homogeneous distribution is advantageous in order to ensure uniform properties over the entire fire-protection element 10.

Mat 12 has a hole density of approximately 2500 ventilation holes per $m^2$. Alternatively, the hole density may be between 100 and 5000 ventilation holes per $m^2$, preferably between 500 and 3000 ventilation holes per $m^2$, more preferably between 1000 and 2000 ventilation holes per $m^2$.

Ventilation holes 14 extend linearly from upper side 18 to underside 20 through fire-protection element 10 (see FIG. 2). For this purpose, special openings may be provided in reinforcing inlay 16, especially when reinforcing inlay 16 has a mesh width that is smaller than diameter D of ventilation holes 14, or reinforcing inlay 16 covers a large part, for example more than 50%, of the cross-sectional area of all ventilation holes 14. Thus it is ensured that ventilation holes 14 provide a free cross section that is substantially sufficient over the entire thickness H to ensure adequate air circulation for heat transport. As is to be seen in FIG. 1, part of the cross-sectional area of a small part of ventilation holes 14 may be covered by reinforcing inlay 16 without hereby substantially impairing the air circulation of fire-protection element 10.

Furthermore, ventilation holes 14 have a circular cross section and hereby can be produced particularly inexpensively. Alternatively, ventilation holes 14 may have any desired cross section and in particular even a cross section that varies over thickness H.

Ventilation holes 14 extend perpendicular to upper side 18 through mat 12 and, due to their circular cross section, form a cylindrical passage hole. Alternatively, at least a part of ventilation holes 14 may extend through mat 12 at an angle differing from 90°. In this case, ventilation holes 14 form passage holes shaped like general or skewed cylinders or prisms, depending on their cross section.

Fire-protection element 10 is designed to be not flexurally stiff. This means that both mat 12 and reinforcing inlay 16 are flexible at least in portions, so that fire-protection element 10 may be adapted to uneven surfaces. As an example, fire-protection element 10 may therefore be wound in tightly bearing manner around one or more lines or around a cable route. In particular, fire-protection element 10 is flexible in such a way that shaping may take place without tools and/or the necessary forces can be applied without undue effort by people of average strength.

In FIG. 3, fire-protection element 10 is shown as part of an inventive fire-protection wrap 30, which is wound, in a manner adjoining a firestop 32, around a cable route 34 having four cables 36, which extend through firestop 32. Firestop 32 is part of a cable penetration of a wall.

In order to assemble fire-protection wrap 30, an appropriately long piece of fire-protection element 10 is wound in circumferential direction U tightly around cable route 34 including cables 36. By virtue of its flexibility, fire-protection element 10 can be adapted to the shape of cable route 34 and of cables 36, so that fire-protection element 10 bears at least in portions on cable route 34 and cables 36.

In this case, fire-protection element 10 is disposed in such a way that upper side 18 forms surface 38 of fire-protection wrap 30 located externally on the environment side and underside 20 forms surface 40 of fire-protection wrap 30 located internally on the cable side. Thus ventilation holes 14 extend from underside 20, which is disposed facing cable route 34 and cables 36, to oppositely disposed upper side 18, which borders the environment.

In this embodiment, reinforcing inlay 16 forms external surface 38 of fire-protection wrap 30 and is therefore particularly well suited for stabilizing the intumescent crust formed in the fire situation and preventing it from falling in pieces from fire-protection wrap 30.

Ends 44, 46 of fire-protection element 10 are joined to one another by way of a fastening means 42, in order to fasten fire-protection wrap 30 securely to cable route 34. Fastening means 42 is a twisted piece of wire that extends through reinforcing inlay 16 at both ends 44, 46. Additionally or alternatively, clamps or clips may also be provided for fastening.

Preferably, a fire-protection wrap 30 is installed on both sides of firestop 32.

In the fire situation, the environment on the side of firestop 32 turned away from the fire is insulated by fire-protection wrap 30 from cables 36 subjected to heating. Furthermore, air is able to flow through ventilation holes 14 and in this way to remove heat from cables 36 or cable route 34 (the circulating air is illustrated in FIG. 3 by arrows). Hereby their temperature can be kept below a limit value for a longer time and the risk that the fire will spread further can be reduced.

In contrast to mineral wool, the inventive fire protection element and the inventive fire-protection wrap further have the advantage that they are substantially free of fibers and do not tend to dust formation. Thus the fire protection element and the fire-protection wrap are suitable in particular for locations that must remain as free as possible from dust and fibers, such as clean rooms or telecommunication systems.

The invention claimed is:

1. A fire-protection element, comprising:
a roll of tape comprising:
a mat of intumescent material; and
a reinforcing inlay on or in the mat,
wherein the mat is provided with a first two-dimensional distribution of ventilation holes with a first uniform spacing, and
wherein the reinforcing inlay has a second two-dimensional distribution of holes with a second uniform spacing, the second two-dimensional distribution of holes arranged in a mesh and the second uniform spacing having a mesh size which is larger than a diameter of each of the ventilation holes.

2. The fire-protection element according to claim 1, wherein the tape has an upper side and an oppositely disposed underside, and wherein the ventilation holes respectively extend linearly from the upper side to the underside.

3. The fire-protection element according to claim 2, wherein the reinforcing inlay extends parallel to the upper side.

4. The fire-protection element according to claim 1, wherein the reinforcing inlay comprises at least one material selected from the group consisting of metal, expanded metal, glass fibers, basalt fibers, carbon fibers, and ceramic fibers.

5. The fire-protection element according to claim 1, wherein the tape including the reinforcing inlay is flexible.

6. The fire-protection element according to claim 1, wherein the reinforcing inlay is on an outer surface of the tape.

7. The fire-protection element according to claim 1, wherein the reinforcing inlay is pressed into a surface of the intumescent material.

8. The fire-protection element according to claim 1, wherein the ventilation holes have a diameter between 5 mm and 50 mm.

9. The fire-protection element according to claim 1, wherein the fire-protection element has a hole density between 100 and 5000 ventilation holes per $m^2$.

10. The fire-protection element according to claim 1, wherein the ventilation holes are distributed substantially homogeneously over the tape.

11. The fire-protection element according to claim 1, wherein the fire-protection element is formed as endless material.

12. The fire-protection element according to claim 1, wherein the intumescent material is free of mineral fibers.

13. A fire-protection wrap for sealing a cable penetration in a wall or ceiling, the fire protection wrap comprising: a fire-protection element according to claim 1, the tape of the fire-protection element configured to be wound around a cable and/or a cable route in order to cover the outer side of the cable and/or of the cable route, wherein the ventilation holes extend from a surface on the cable side to a surface on an environment side.

14. The fire-protection element according to claim 5, wherein the reinforcing inlay is flexible and not flexurally stiff.

15. The fire-protection element according to claim 8, wherein the ventilation holes have a diameter between 8 mm and 15 mm.

16. The fire-protection element according to claim 9, wherein the fire-protection element has a hole density between 1000 and 2000 ventilation holes per $m^2$.

17. The fire-protection element according to claim 11, wherein the fire-protection element has a thickness of 8 mm to 15 mm.

18. The fire-protection element according to claim 17, wherein the material is configured to be a tape or a rolled tape.

19. The fire-protection element according to claim 1, wherein the reinforcing inlay covers part of a cross-sectional area of at least one of the ventilation holes.

* * * * *